(12) United States Patent
Guillon et al.

(10) Patent No.: US 7,691,355 B2
(45) Date of Patent: Apr. 6, 2010

(54) PROCESS FOR THE PREPARATION OF MAGADIITE FROM AN ORGANIC STRUCTURING AGENT OF QUATERNARY DIAMMONIUM TYPE

(75) Inventors: Emmanuelle Guillon, Vernaison (FR); Nicolas Bats, Feyzin (FR); Antoine Fecant, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 63 days.

(21) Appl. No.: 11/956,820

(22) Filed: Dec. 14, 2007

(65) Prior Publication Data

US 2008/0159941 A1    Jul. 3, 2008

(30) Foreign Application Priority Data

Dec. 15, 2006  (FR) .................................. 06 10997

(51) Int. Cl.
*C01B 33/26* (2006.01)
*C01B 33/32* (2006.01)

(52) U.S. Cl. .................................. 423/327.1; 423/334

(58) Field of Classification Search ............... 423/327.1
See application file for complete search history.

(56) References Cited

U.S. PATENT DOCUMENTS

| | | | | | |
|---|---|---|---|---|---|
| 4,689,207 | A | * | 8/1987 | Zones | ........................ 423/705 |
| 4,968,652 | A | * | 11/1990 | Johnson et al. | ............... 502/63 |
| 4,980,333 | A | * | 12/1990 | Landis et al. | ............... 502/246 |
| 5,041,402 | A | * | 8/1991 | Casci et al. | ................... 502/67 |
| 5,284,577 | A | * | 2/1994 | Shih et al. | ............... 208/251 H |
| 2005/0191227 | A1 | | 9/2005 | Barea | |

FOREIGN PATENT DOCUMENTS

EP   1559681 A   8/2005

* cited by examiner

*Primary Examiner*—Melvin C Mayes
*Assistant Examiner*—Michael Forrest
(74) *Attorney, Agent, or Firm*—Millen, White, Zelano, Branigan, P.C.

(57) ABSTRACT

Described is a process for the preparation of a crystallised lamellar solid formed by magadiite consisting of implementing in a step (i) mixing of at least one silica source, at least one salt of N,N,N',N'-tetramethyl-N,N'-dibenzyloctanediammonium, at least one alkali and/or alkaline earth metal M and water and then implementing in a step (ii) hydrothermal treatment of said mixture until said crystallised lamellar solid constituted by magadiite is formed.

17 Claims, No Drawings

PROCESS FOR THE PREPARATION OF MAGADIITE FROM AN ORGANIC STRUCTURING AGENT OF QUATERNARY DIAMMONIUM TYPE

FIELD OF THE INVENTION

The invention concerns the field of the preparation of solids formed by magadiite. These involve silicate-based lamellar solids also known by the name of lamellar solids of phyllosilicates or lamellar silicates type. The expression silicate-based lamellar solid is used to denote a solid compound formed by layers (or sheets) which are superposed but separated from each other by a distance varying between 2 and 5 Å, said sheets being formed by silica arranged in tetrahedric co-ordination ($SiO_4$). Elements other than silicon Si can be present in the solid, also in the tetrahedric position.

PRIOR ART

Among lamellar silicates, mention may be made of magadiite, natrosilite, kenyaite, makatite, nekoite, kanemite, okenite, dehayelite, macdonalite and rhodesite.

Those solids often exist in the natural state with a composition of the type $A_xSi_yO_z$, $nH_2O$, with $1 \leq x \leq 15$, $2 \leq y \leq 32$, $4 \leq x \leq 80$ and $0 \leq n \leq 20$ x, y, z and n being rational numbers or integers), and A can be for example an element sodium or potassium. Such lamellar solids involve for example the composition $Na_2Si_{14}O_{29}.9H_2O$ for magadiite and the composition $Na_2Si_{20}O_{41}.10H_2O$ for kenyaite. The solids obtained by synthesis are of the same composition as the solids which are present in the natural state. Those lamellar silicates, in particular magadiite, often involve a three-dimensional structure with interactions of Van der Walls type between the sheets and a small specific surface area.

Those lamellar silicates and in particular magadiite have absorption and exchange properties which are of interest. Those solids are particularly suited for the adsorption of water or organic molecules and for cationic surface exchange. Recently, lamellar silicates have been widely studied in relation to their capacity to become an acid solid by protonic exchange. Other studies have also demonstrated that the introduction of pillars into the interlamellar spaces makes it possible to create a mesoporosity and to increase the specific surface area.

It is known from patent application WO 88/00091 to synthesise a bridged lamellar silicate from a lamellar silicate formed by synthesis magadiite which was prepared using an organic structuring agent which is selected from benzyltriethylammonium chloride, benzyltrimethylammonium chloride, dibenzyldimethylammonium chloride, N,N'-dimethylpiperazine, triethylamine or other quaternary compounds or heterocyclic amines.

It is also known from patent application WO 91/12204 to synthesise a crystallised lamellar silicate of kenyaite type using an organic compound selected from an alkylamine, a trialkylamine, a tetraalkylammonium compound and a diamine trimethylhexamethylenediamine, said alkyl having from 1 to 12 carbon atoms.

It is known from patent application EP-A-1 559 681 to synthesise lamellar solids based on silicates of kenyaite and magadiite type using an organic structuring agent selected from tyramine, 4-aminophenol, trans-4-aminocyclohexanol, 2-(4-amino-phenyl)-ethanol or other compounds comprising at least one alcohol group and at least one amine group which are separated by a hydrocarbon chain having from 1 to 20 carbon atoms.

BRIEF DESCRIPTION OF THE INVENTION

The invention concerns a process for the preparation of a crystallised lamellar solid formed by magadiite consisting of implementing in a step (i) mixing of at least one silica source, at least one salt of N,N,N',N'-tetramethyl-N,N'-dibenzyloctanediammonium, at least one alkali and/or alkaline earth metal M and water and then implementing in a step (ii) hydrothermal treatment of said mixture until said crystallised lamellar solid constituted by magadiite is formed. Advantageously said mixture formed in the course of said step (i) comprises at least one source of at least one element X involving tetrahedric coordinance and differing from silicon.

It was discovered that, surprisingly, a nitrode-bearing organic structuring agent comprising two quaternary ammonium functions separated by the unit of a methylene chain—($CH_2$)—repeated 8 times, a salt of N,N,N',N'-tetramethyl-N,N'-dibenzyloctanediammonium, mixed with a silica source, at least one alkali and/or alkaline earth metal and water, leads to the production of a high-purity magadiite. The process according to the invention most often leads to a pure magadiite, in the absence of any other crystallised or amorphous phase. The magadiite obtained with the process of the invention is produced with a better degree of selectivity than the solids formed by magadiite which are obtained in accordance with the processes in the state of the art. In addition such a magadiite prepared by the process of the invention is obtained with very good crystallinity. Purity and selectivity are determined by X-ray diffraction.

DETAILED DESCRIPTION OF THE INVENTION

The invention concerns a process for the preparation of a crystallised lamellar solid formed by magadiite consisting of implementing in a step (i) mixing of at least one silica source, at least one salt of N,N,N',N'-tetramethyl-N,N'-dibenzyloctanediammonium, at least one alkali and/or alkaline earth metal M and water and then implementing in a step (ii) hydrothermal treatment of said mixture until said crystallised lamellar solid constituted by magadiite is formed.

The salt of N,N,N',N'-tetramethyl-N,N'-dibenzyloctanediammonium which is incorporated in step (i) of the preparation process of the invention is preferably a N,N,N',N'-tetramethyl-N,N'-dibenzyloctanediammonium dihalide and very preferably a N,N,N',N'-tetramethyl-N,N'-dibenzyloctanediammonium dibromide. That salt is synthesised by any method known to the man skilled in the art. If it is a N,N,N',N'-tetramethyl-N,N'-dibenzyloctanediammonium dihalide, the process involves mixing one mole of dihalogenooctane and at least 2 moles of N-benzyldimethylamine. For the synthesis of N,N,N',N'-tetramethyl-N,N'-dibenzyloctanediammonium dibromide, the process involves mixing one mole of 1,8-dibromooctane and at least 2 moles of N-benzyldimethylamine.

The alkali and/or alkaline earth metal M incorporated in step (i) of the preparation process according to the invention is selected from lithium, potassium, sodium and calcium and a mixture of at least two of those metals. Preferably said metal M is an alkali metal and very preferably it is sodium.

The silica source incorporated in step (i) of the preparation process according to the invention can be any one of those currently used in the synthesis of crystallised lamellar solids based on silicates, for example silica in powder form, silicic acid, colloidal silica, dissolved silica or tetraethoxysilane (TEOS). Among the silicas in powder form, it is possible to use precipitated silicas, in particular those obtained by precipitation from a solution of silicate of alkali metal such as pyrogenated silicas, for example "CAB-O-SIL" and silica gels. It is possible to use colloidal silicas involving different particle sizes, for example of a mean equivalent diameter of between 10 and 15 nm or between 40 and 50 nm, such as those commercialised under the registered marks such as "LUDOX". Preferably the silicon source is LUDOX.

In accordance with the process for the preparation of a crystallised lamellar solid according to the invention, the mixture formed in the course of the step (i) advantageously comprises at least one source of at least one element X involving tetrahedric coordinance and differing from silicon. More preferably the element X is selected from the group formed by aluminium, boron, chromium, iron, gallium, indium, nickel, zirconium, cobalt, titanium, zinc, copper, niobium and europium and a mixture of at least two of those elements. Still more preferably the element X is aluminium. The source of the element X may be any compound comprising the element X and capable of liberating that element in aqueous solution in reactive form. The element X can be incorporated into the mixture in an oxidated form $XO_n$ with $1 \leq n \leq 3$ (n being a rational number or an integer), or in any other form such as for example a diacetate of the element X, in particular $Co(CH_3COO)_2$, $Ni(CH_3COO)_2$, $Zn(CH_3COO)_2$, $Cu(CH_3COO)_2$, $Cr(CH_3COO)_2$ and $Eu(CH_3COO)_2$. When X is titanium, $Ti(EtO)_4$ is advantageously used, when X is zirconium, $Zr(OH)_4$ is advantageously used, and when X is niobium $Nb_2B_4O_7$ or $Nb_2O_5$ is advantageously used. In the preferred case where X is aluminium the alumina source is preferably sodium aluminate or an aluminium salt, for example chloride, nitrate, hydroxide or sulphate, an aluminium alkoxide or alumina in the true sense, preferably in hydrated or hydratable form, such as for example colloidal alumina, pseudoboehmite, gamma alumina or alpha or beta trihydrate. It is also possible to use mixtures of the above-mentioned sources.

In accordance with the preparation process according to the invention the reaction mixture obtained in step (i) is of a chemical composition expressed in terms of moles of oxides by the following formula:

$$SiO_2 : wXO_n : xM^+OH^- : yH_2O : zRO$$

w being between 0 and 0.5, preferably between 0 and 0.1, very preferably between 0.001 and 0.1, x being between 0.001 and 1, preferably between 0.01 and 0.6, y being between 10 and 100, z being between 0.01 and 3, preferably between 0.05 and 1, and n being between 1 and 3, and in which X is at least one element involving tetrahedric coordinance and differing from silicon, preferably selected from the group formed by aluminium, boron, chromium, iron, gallium, indium, nickel, zirconium, cobalt, titanium, zinc, copper, niobium and europium and the mixture of at least two of those elements, still more preferably X is aluminium, M is at least one cation selected from lithium, potassium, sodium and calcium and a mixture of at least two of those metals, preferably sodium, R is N,N,N',N'-tetramethyl-N,N'-dibenzyloctanediammonium. w, x, y and z respectively represent the number of moles of $XO_n$, $M^+OH^-$, $H_2O$ and RO.

In accordance with step (ii) of the process of the invention the hydrothermal treatment of the reaction mixture is effected until said crystallised lamellar solid constituted by magadiite is formed. The reaction mixture is advantageously put under hydrothermal conditions under an autogenous reaction pressure, possibly with the addition of gas, for example nitrogen, at a crystallisation temperature of between 100 and 200° C., preferably between 110° C. and 170° C., until formation of the lamellar crystals of magadiite occurs. The period of time necessary to achieve crystallisation generally varies between 1 and 50 days, preferably between 3 and 21 days and more preferably between 5 and 10 days. During the duration of crystallisation step (ii) the reaction mixture can be vigorously agitated or may not be. The operating conditions for the crystallisation operation are selected by the man skilled in the art to obtain pure magadiite, in the absence of any other crystallised or amorphouse phase. The preparation process according to the invention is thus highly selective as it results in pure magadiite under the above-indicated crystallisation operating conditions.

Preferably the product obtained at the end of the crystallisation step (ii) is subjected to at least one of the following steps and preferably all of the following steps:

(iii) a step for separation of the crystallised lamellar solid from the crystallisation mixture, (iv) a step of washing the crystallised lamellar solid, and (v) a step of drying the crystallised solid.

The crystallised solid is generally separated from the mixture in accordance with step iii) of the preparation process according to the invention by any method known to the man skilled in the art such as filtration. The solid is then washed with water in accordance with step iv) of the process of the invention, preferably using deionised water. Step v) is generally carried out at a temperature of between 50 and 150° C. for a period ranging from 12 to 30 hours. The drying operation is preferably effected at atmospheric pressure but it may also be carried out under pressure. At the end of all those steps the result obtained is a crystallised lamellar solid formed by magadiite.

In accordance with the invention it is advantageous to carry out a cationic exchange operation in respect of the alkali and/or alkaline earth metal introduced in the course of said step i) of the process for the preparation of said crystallised lamellar solid, said cationic exchange being carried out with hydrogen ions at the end of step v) for drying said lamellar solid. That cationic exchange with protons imparts acidity to the crystallised lamellar solid formed by magadiite.

The following examples illustrate the invention without limiting the scope thereof.

EXAMPLE 1 synthesis of N,N,N',N'-tetramethyl-N,N'-dibenzyloctanediammonium dibromide 50 g of 1,8-dibromooctane (0.18 mole, 99%, Aldrich) is added in a 500 ml balloon flask containing 150 ml of ethanol and 62 g of N-benzyldimethylamine (0.46 mole, 99% Aldrich). The reaction mixture is agitated and put under reflux for a period of 10 h. The mixture is then cooled to ambient temperature, poured into 300 ml of diethylether and then filtered and washed with 100 ml of diethylether. The solid obtained is dried under vacuum for a period of 12 h. The result obtained is 97 g of a white solid (that is to say, a yield of 97%).

The product has the expected $^1H$ NMR spectrum. $^1H$ NMR ($D_2O$, ppm/TMS): 1.23 (8H,m); 1.71 (4H,m); 2.85 (12H,s); 3.10 (4H,m); 4.31 (4H,s); 7.40 (10H,m).

EXAMPLE 2

Synthesis of Silicic Magadiite 13.8 g of a colloidal silica suspension known by the commercial name Ludox HS-40 and marketed by Aldrich is incorporated into a solution composed of 1.25 g of sodium hydroxide (prolabo), 8.31 g of N,N,N',N'-tetramethyl-N,N'-dibenzyloctanediammonium dibromide in 46.63 g of deionised water. The mixture is vigorously agitated for half an hour. The mixture is then transferred, after homogenisation, into an autoclave. The autoclave is heated for a period of 5 days at 130° C. in an oven without agitation. The crystallised product obtained is filtered, washed with deionised water (to reach a neutral pH) and then dried for one night at 100° C.

The diffractogram (DRX) carried out on that product is characteristic of pure magadiite.

EXAMPLE 3

Synthesis of Magadiite Substituted with Aluminium 13.8 g of a colloidal silica suspension known by the commercial name Ludox HS-40 and marketed by Aldrich is incorporated into a solution composed of 0.084 g of sodium aluminate (Carlo Erba), 1.22 g of sodium hydroxide (prolabo), 8.31 g of N,N,N',N'-tetramethyl-N,N'-dibenzyloctanediammonium dibromide in 46.60 g of deionised water. The mixture is vigorously agitated for half an hour. The gel formed in that way has an Si/Al ratio of 120. The mixture is then transferred, after homogenisation, into an autoclave. The autoclave is heated for a period of 7 days at 130° C. in an oven without agitation. The crystallised product obtained is filtered, washed with deionised water (to reach a neutral pH) and then dried for one night at 100° C.

The diffractogram (DRX) carried out on that product is characteristic of pure magadiite.

EXAMPLE 4

Synthesis of Magadiite Substituted with Aluminium 13.8 g of a colloidal silica suspension known by the commercial name Ludox HS-40 and marketed by Aldrich is incorporated into a solution composed of 0.034 g of sodium aluminate (Carlo Erba), 1.24 g of sodium hydroxide (prolabo), 8.31 g of N,N,N',N'-tetramethyl-N,N'-dibenzyloctanediammonium dibromide in 46.63 g of deionised water. The mixture is vigorously agitated for half an hour. The gel formed in that way has an Si/Al ratio of 300. The mixture is then transferred, after homogenisation, into an autoclave. The autoclave is heated for a period of 7 days at 130° C. in an oven without agitation. The crystallised product obtained is filtered, washed with deionised water (to reach a neutral pH) and then dried for one night at 100° C.

The diffractogram (DRX) carried out on that product is characteristic of pure magadiite.

EXAMPLE 5

(not according to the invention): synthesis of N,N,N',N'-tetramethyl-N,N'-dibenzylbutanediammonium dibromide 50 g of 1,4-dibromobutane (0.23 mole, 99% Aldrich) is added in a 500 ml balloon flask containing 150 ml of ethanol and 72 g of N-benzyldimethylamine (0.53 mole, 99% Aldrich). The reaction mixture is agitated and put under reflux for a period of 10 h. The mixture is then cooled to ambient temperature, poured into 300 ml of diethylether and then filtered and washed with 100 ml of diethylether. The solid obtained is dried under vacuum for a period of 12 h. The result obtained is 105 g of a white solid (that is to say, a yield of 94%).

The product has the expected $^1$H NMR spectrum. $^1$H NMR ($D_2O$, ppm/TMS) 1.79 (4H, m); 2.88 (12H, s); 3.23 (4H, m); 4.34 (4H, s); 7.49 (10H, m).

EXAMPLE 6

(not according to the invention): hydrothermal synthesis in the presence of N,N,N',N'-tetramethyl-N,N'-dibenzylbutanediammonium dibromide as a structuring agent 13.9 g of a colloidal silica suspension known by the commercial name Ludox HS-40 and marketed by Aldrich is incorporated into a solution composed of 0.344 g of sodium aluminate (Carlo Erba), 1.11 g of sodium hydroxide (prolabo), and 7.53 g of N,N,N',N'-tetramethyl-N,N'-dibenzylbutanediammonium in 47.07 g of deionised water. The mixture is vigorously agitated for half an hour. The mixture is then transferred, after homogenisation, into an autoclave. The autoclave is heated for a period of 7 days at 130° C. in an oven without agitation. The product obtained is filtered, washed with deionised water (to reach a neutral pH) and then dried for one night at 100° C.

Analysis by X-ray diffraction shows that the solid formed is constituted only by amorphous phases.

EXAMPLE 7

(not according to the invention): hydrothermal synthesis in the presence of N,N,N',N'-tetramethyl-N,N'-dibenzylbutanediammonium dibromide as a structuring agent 14.0 g of a colloidal silica suspension known by the commercial name Ludox HS-40 and marketed by Aldrich is incorporated into a solution composed of 1.25 g of sodium hydroxide (prolabo) and 7.54 g of N,N,N',N'-tetramethyl-N,N'-dibenzylbutanediammonium in 47.25 g of deionsed water. The mixture is vigorously agitated for half an hour. The mixture is then transferred, after homogenisation, into an autoclave. The autoclave is heated for a period of 14 days at 130° C. in an oven without agitation. The product obtained is filtered, washed with deionised water (to reach a neutral pH) and then dried for one night at 100° C.

Analysis by X-ray diffraction shows that the solid formed is constituted only by amorphous phases and zeolite ZSM-12.

EXAMPLE 8

(not according to the invention): hydrothermal synthesis in the presence of N,N,N',N'-tetramethyl-N,N'-dibenzylbutanediammonium dibromide as a structuring agent 14.0 g of a colloidal silica suspension known by the commercial name Ludox HS-40 and marketed by Aldrich is incorporated into a solution composed of 1.26 g of sodium hydroxide (prolabo) and 7.54 g of N,N,N',N'-tetramethyl-N,N'-dibenzylbutanediammonium in 47.22 g of deionised water. The mixture is vigorously agitated for half an hour. The mixture is then transferred, after homogenisation, into an autoclave. The autoclave is heated for a period of 7 days at 170° C. in an oven without agitation. The product obtained is filtered, washed with deionised water (to reach a neutral pH) and then dried for one night at 100° C.

Analysis by X-ray diffraction shows that the solid formed is constituted only by dense phases such as quartz and cristobalite and zeolite ZSM-12.

EXAMPLE 9

(not according to the invention, in accordance with WO 88/00091): synthesis of magadiite substituted with aluminium in the presence of dibenzyldimethylammonium chloride as a structuring agent 24.5 g of dibenzyldimethylammonium chloride is added to a solution containing 0.63 g of sodium aluminate, 4.0 g of sodium hydroxide and 30.0 g of deionised water. The mixture is added to 134.0 g of colloidal silica and then mixed. The mixture is heated at 140° C. in an static reactor for a period of 21 days.

Analysis by X-ray diffraction indicates that the product obtained is formed by magadiite and a trace of mordenite.

Without farther elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 06/10.997, filed Dec. 15, 2006, are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. In a process for the preparation of a crystallised lamellar solid magadiite comprising step (i) mixing at least one silica source, at least one alkali and/or alkaline earth metal M, a structuring agent and water and then implementing in a step (ii) hydrothermal treatment of said mixture until said crystallised lamellar solid is formed, an improvement wherein the structuring agent is at least one salt of N,N,N',N'-tetramethyl-N,N'-dibenzyloctanediammonium.

2. A preparation process according to claim 1 wherein said salt of N,N,N',N'-tetramethyl-N,N'-dibenzyloctanediammonium is a N,N,N',N'-tetramethyl-N,N'-dibenzyloctanediammonium dihalide.

3. A preparation process according to claim 1 wherein said salt is a N,N,N',N'-tetramethyl-N,N'-dibenzyloctanediammonium dibromide.

4. A preparation process according to claim 1 wherein said alkali and/or alkaline earth metal M is selected from lithium, potassium, sodium and calcium and mixtures thereof.

5. A preparation process according to claim 4 wherein said alkali and/or alkaline earth metal M comprises sodium.

6. A preparation process according to claim 1 wherein at least one said source of silica in step (i) is a colloidal silica.

7. A preparation process according to claim 1 wherein step (i) further comprises mixing at least one source of at least one element X having a tetrahedric coordinance differing from silicon.

8. A preparation process according to claim 7 wherein said element X is aluminium.

9. A preparation process according to claim 1 wherein the reaction mixture obtained in said step (i) is of a chemical composition expressed in terms of moles of oxides by the following formula:

$$SiO_2:wXO_n:xM^+OH^-:yH_2O:zRO$$

w being between 0 and 0.5, x being between 0.001 and 1, y being between 10 and 100, z being between 0.01 and 3, n being between 1 and 3, and in which X is at least one element of tetrahedric coordination and differing from silicon, M is at least one cation selected from lithium, potassium, sodium and calcium and a mixture of at least two of those metals, R is N,N,N',N'-tetramethyl-N,N'-dibenzyloctanediammonium, w, x, y and z respectively representing the number of moles of $XO_n$, $M^+OH^-$, $H_2O$ and RO.

10. A preparation process according to claim 1 wherein step (ii) is carried out by subjecting said reaction mixture to hydrothermal conditions under an autogenous reaction pressure at a crystallisation temperature of between 100 and 200° C.

11. A preparation process according to claim 10 wherein said step (ii) is conducted for a duration that varies between 1 and 50 days.

12. A preparation process according to claim 1 wherein said product resulting from said crystallisation step (ii) is subjected to at least:

(iii) a step for separation of the crystallised lamellar solid from the crystallisation mixture, (iv) a step of washing the crystallised lamellar solid, and (v) a step of drying the crystallised lamellar solid.

13. A preparation process according to claim 7 wherein said salt is a N,N,N',N'-tetramethyl-N,N'-dibenzyloctanediammonium dibromide.

14. A preparation process according to claim 6 wherein said salt is a N,N,N',N'-tetramethyl-N,N'-dibenzyloctanediammonium dibromide.

15. A preparation process according to claim 7 wherein said salt is a N,N,N',N'-tetramethyl-N,N'-dibenzyloctanediammonium dibromide.

16. A preparation process according to claim 15 wherein said element X is aluminium.

17. A preparation process according to claim 16 wherein said alkali and/or alkaline earth metal M comprises sodium.

* * * * *